J. V. PUGH.
ROTATIONAL DRIVING CONNECTION SUCH AS DETACHABLE WHEEL HUBS.
APPLICATION FILED JAN. 27, 1921.

1,424,211.

Patented Aug. 1, 1922.
6 SHEETS—SHEET 1.

INVENTOR
J. V. Pugh,
BY Marks & Clerk
ATTORNEYS

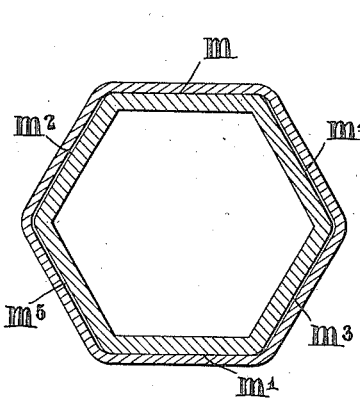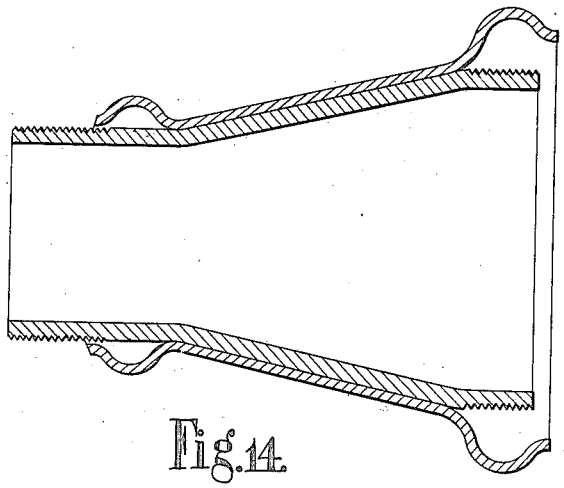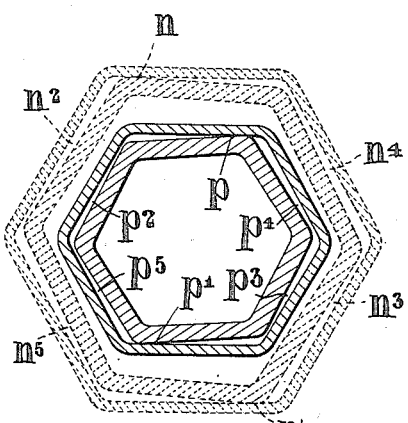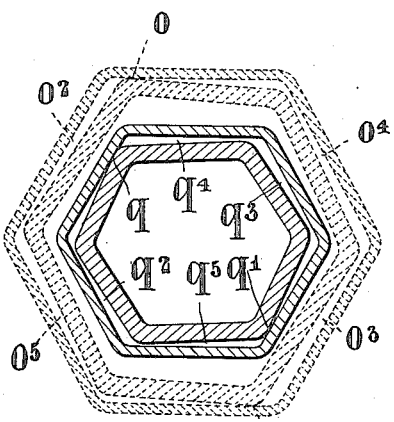

UNITED STATES PATENT OFFICE.

JOHN V. PUGH, OF COVENTRY, ENGLAND, ASSIGNOR TO RUDGE-WHITWORTH LIMITED, OF COVENTRY, WARWICK, ENGLAND, A COMPANY OF GREAT BRITAIN.

ROTATIONAL DRIVING CONNECTION SUCH AS DETACHABLE WHEEL HUBS.

1,424,211.   Specification of Letters Patent.   Patented Aug. 1, 1922.

Application filed January 27, 1921. Serial No. 440,534.

*To all whom it may concern:*

Be it known that I, JOHN V. PUGH, a subject of the King of Great Britain and Ireland, and residing at Rudge Works, Crow Lane, Coventry, in the county of Warwick, England, have invented certain new and useful Improvements in Rotational Driving Connections such as Detachable Wheel Hubs, of which the following is a specification.

This invention relates to pairs of rotating members such, for example, as shafts and wheels or any equivalent devices, in which an outer or encircling member is carried upon an inner or central one.

In detachable wheels the method of mounting outer hubs upon inner hubs to centre and prevent relative rotation by using tapered serrations, or parallel serrations with a separate cone seating, is well known, and the use of a tapered wavy surface and tapered polygonal surfaces is also known, as are also the difficulties attending the prevention of rotational play or slackness in parts which are frequently separated and re-assembled.

With the exception of the tapered wavy and polygonal surfaces, there are certain manufacturing difficulties in adopting these methods. For example, it weakens a sheet metal construction to form serrated surfaces by cutting away metal, and it is very difficult to form such surfaces by any other means. The wavy surfaces do not present such a difficult problem, and even less so the polygonal surfaces.

In the manufacture of hubs with polygonal contacting surfaces, it is almost an impossibility to ensure that all the polygonal faces of one member shall be in absolute contact with all the faces of the other member when both are in their proper position for driving. It may happen that two opposite faces upon the inner hub stand proud of the other faces, so that these two faces only are in contact with their complementary faces upon the outer hub, leaving a space between all the other faces. This space would allow of a detrimental sliding movement between the two hubs at right angles to the axis of the wheel or in a radial direction.

It would be possible to prevent this sliding movement taking place were both parts of irregular polygonal form, the one complementary to the other, care being taken that any two sides of the polygon, when shown as a plane figure, must not be parallel; but in this case the outer member could only be mounted upon the inner member when both were in one particular position, and not as in the case of a regular polygon, when in as many positions as there are sides to the polygon, therefore members having contacting surfaces of irregular polygonal form would not be satisfactory in use. This particularly applies to wheel hubs.

The object of the present invention is to rigidly and more or less concentrically secure an outer member upon an inner member in such a manner as to provide an efficient and durable driving connection.

Referring now to the accompanying more or less diagrammatic drawings,

Figures 13 and 14 illustrate an objection which may exist in engaging surfaces of polygonal or multi-sided regular forms;

Figure 10:
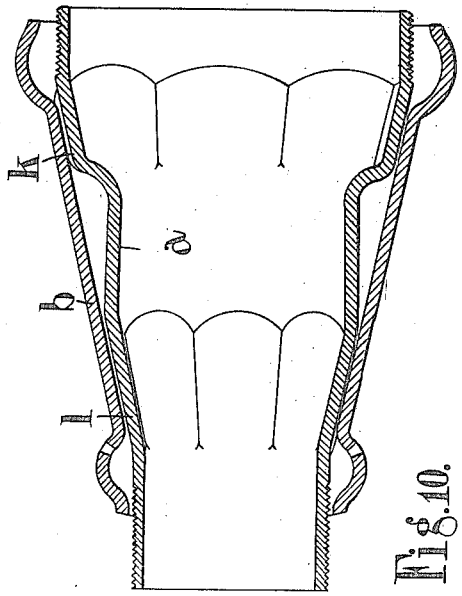
Figures 9 and 10 show a form in which the series of engaging surfaces represent multi-sided regular figures.

Figures 15 and 16 further illustrate such objection say as occuring in a form of the type indicated in Figure 10.

Figure 17:
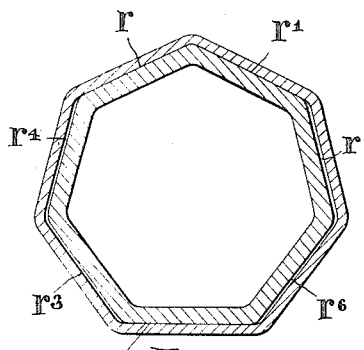
Figure 18:
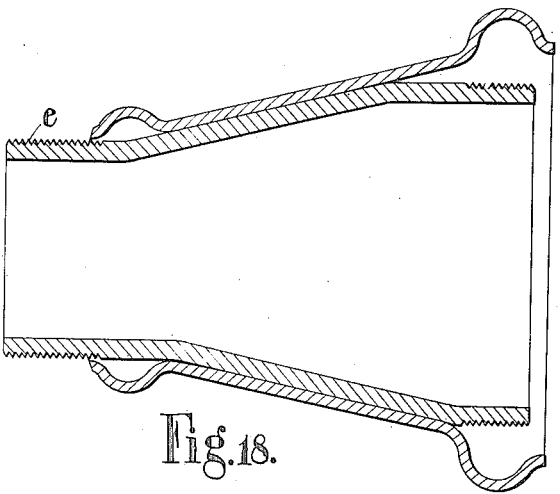

Figures 17 and 18 illustrate the manner of overcoming the objection shown in Figures 13 and 14.

Figure 19:
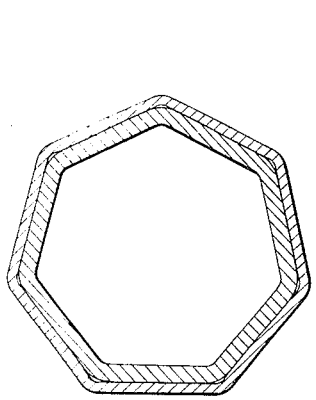
Figure 20:
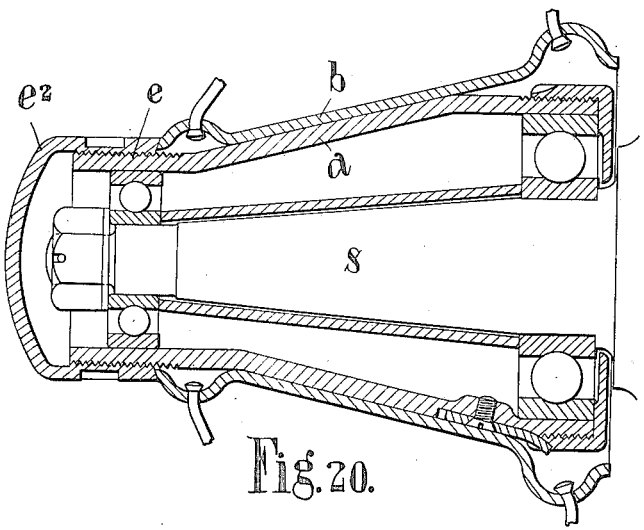

Figures 19 and 20 show in rather more detail the hub structure last indicated.

Figure 22:
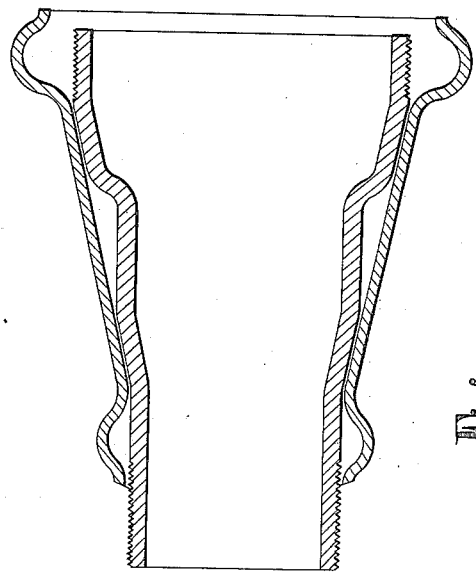
Figure 21:
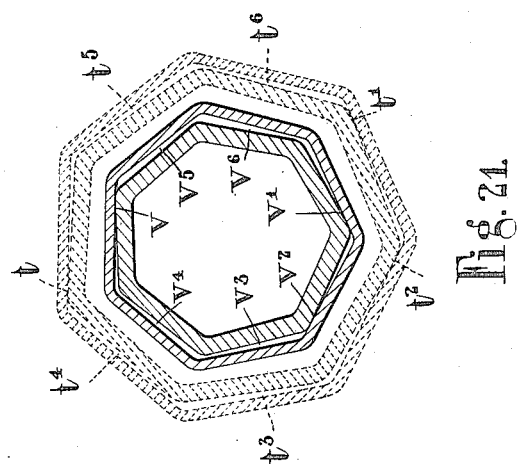

Figures 21 and 22 indicate how the objection is removed in a structure such as indicated in Figure 10.

Figures 1, 2:
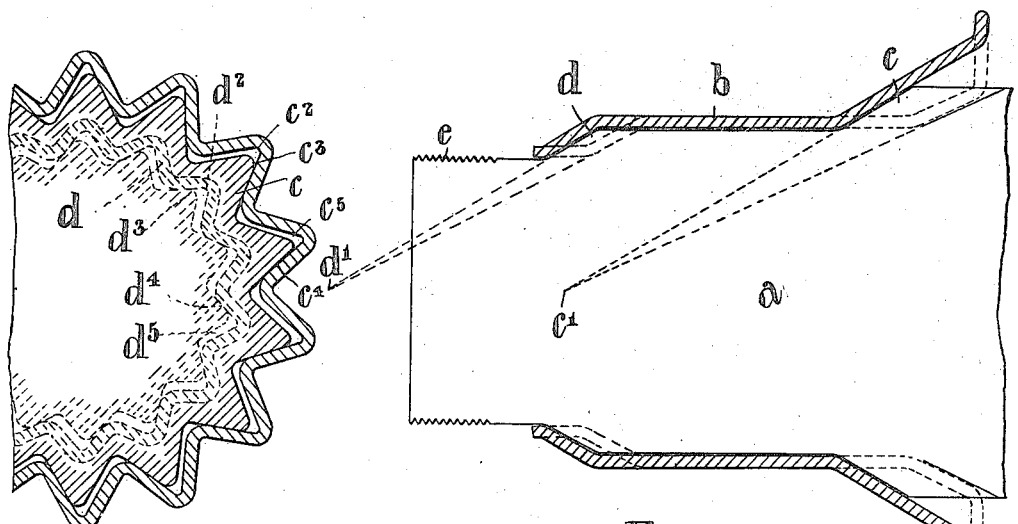
Figures 1 and 2 show fragmental views of one form of driving connection for the hubs of detachable wheels for vehicles.

In carrying the invention into effect as shown by way of example in Figures 1 and 2, in its application to the hubs of detachable wheels for vehicles, an inner hub part *a* and an outer hub part $b$ are provided with two sets of complementary engaging means, one set being adjacent to the inside and the other set being adjacent to the outside ends of the hub parts:

The two sets of engaging means $c$ and $d$ are generally similar in form, the inside set $c$ being positioned at a greater radius from the axis of the hub than the outside set $d$, so that elements of the set $c$ will pass easily over those of the set $d$ without engagement therewith.

The outer hub part $b$ is positioned upon the inner hub part $a$ by an axial sliding movement in the usual manner and it may be retained thereon by a nut (not shown) screwed upon the threads $e$ and engaging a flange or other abutment surface (not shown) at the end of the outer hub part $b$, the aforesaid nut or any other form of holding means which may take the place thereof being adapted to exert a force pressing the outer hub part upon the inner hub part.

The engaging surfaces $c$ and $d$ take the form of two series or sets of angular or V-shaped tapering projections and recesses, the set $c$ converging upon the apex $c_1$ and the set $d$ converging upon the apex $d_1$. The bottom ridges $c_2$, $d_2$ of the recesses in the outer hub part $b$ are arranged upon the same radial lines or planes, but the top ridges $c_3$, $d_3$ of the complementary projections on the inner hub part $a$ are positioned at a small angular distance apart, so that when the outer hub part is forced in an axial direction upon the inner hub part the set of engaging means $c$ will be forced into close driving contact upon one side, as shown at $c_4$, with a clearance space at $c_5$, whereas the other set of engaging means $d$ will be forced into close driving contact upon the opposite side $d_4$ with a clearance space at $d_5$.

The foregoing conditions ensure that the inner and outer parts are in close contact for driving in either direction and that they are at the same time rigidly held with their respective axes as nearly concentric as possible and movement in any direction between the two members is prevented.

Figures 3, 4:
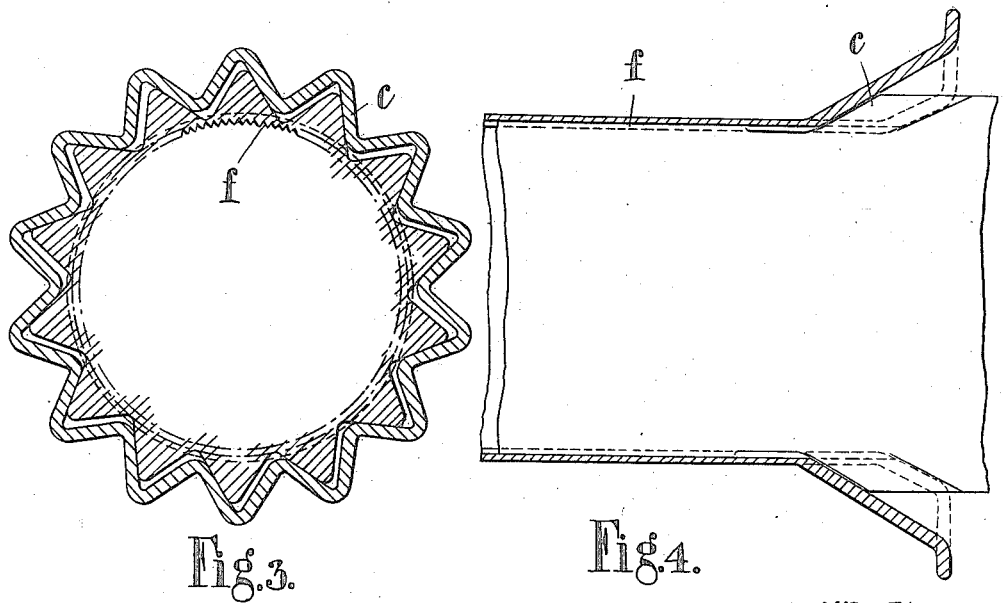
Figures 3 and 4 are corresponding views of hub parts having engaging means of somewhat different forms.

In the constructions shown in Figures 3 and 4, one set only of large-sized tapering engaging means $c$ are provided at the inside end of the hub and the other set of engaging means take the form of smaller V-shaped serrations $f$ running parallel with the axis of the hub and formed upon a surface of smaller radius than the smallest portions of the other set of engaging means $c$.

In this form the two sets of engaging means of one or other of the hub parts are positioned at a slight angular distance from one another, so that close contact for driving in both directions of rotation is ensured as before described and as the inner and outer parts can only have one angular position in relation to one another a pilot piece is provided to quickly effect this purpose.

Figure 5:
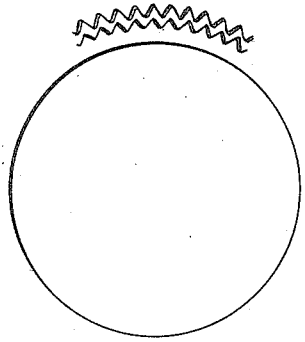
Figures 5 and 6 show other forms of engaging means in which one set takes a slightly spiral form.
Figure 6:
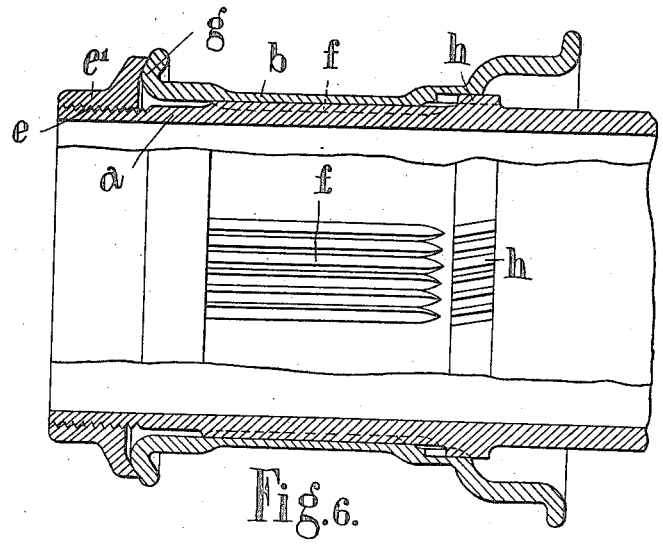

In the construction shown in Figures 5 and 6 the outer hub part $b$ is, as already described, held upon the inner hub part $a$ by a nut $e_1$ screwed upon the thread $e$ and engaging the flange or abutment surface $g$ of the outer hub part.

In this construction one set of engaging means $f$ takes the form of parallel serrations, as described in connection with Figures 3 and 4, and the other set $h$, which are of similar cross-section but positioned at a somewhat greater radial distance from the axis, take a slightly helical direction. The helical direction given to the engaging means $h$ has the same effect as the angular distance between the engaging means in the forms previously described, namely, producing close contact for driving in one direction in one set and close contact for driving in the other direction in the other set. In this arrangement, however, because angular movement between the inner and outer members is determined by the clearance between the parallel serrations and the angle of the helix across the axis should exceed the angle of friction to prevent jamming, the axial engagement of the helical serrations will necessarily be small.

It will be clear that engaging means $f$ and $h$ of the form shown in Figures 5 and 6 may both take a more or less helical direction, provided the inclination of one set is greater than the inclination of the other, or that the two sets are inclined in opposite directions to the axis of the hub.

Figure 7:
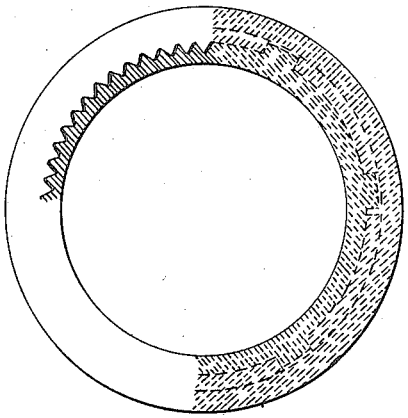
Figures 7 and 8 show another form of driving connection with inclined sided engaging elements.
Figure 8:
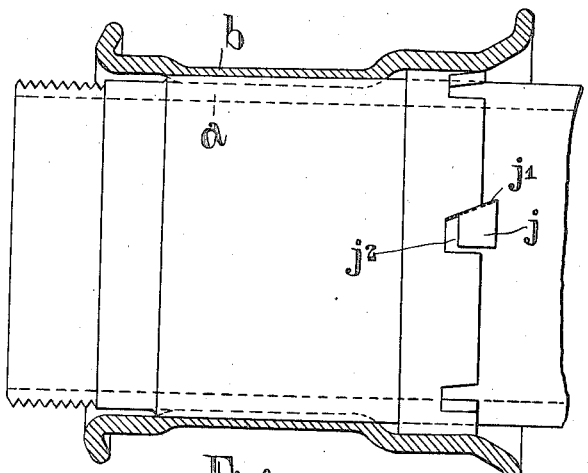

The construction shown in Figures 7 and 8 is in many respects similar to that shown in Figures 5 and 6. In place, however, of the short helical serrations $h$, dogs $j$ having inclined cam surfaces $j_1$ are provided on the inner hub part $a$ to engage pockets or recesses $j_2$ in the outer hub part $b$ or in a cylindrical member securely attached to the outer part $b$. Dogs and recesses of this type may also be used in conjunction with the tapering engaging means $c$ shown in Figures 1 and 2, 3 and 4, if desired.

Figure 9:
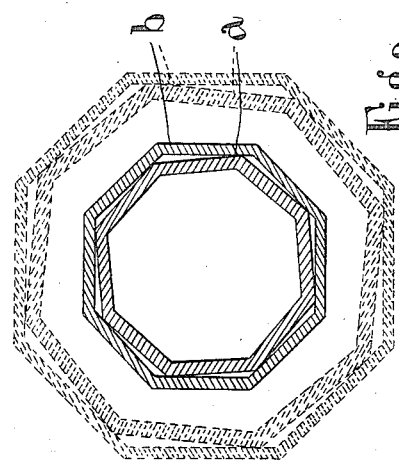

In the hub shown in Figures 9 and 10, the engaging means in cross section take the form of regular multi-sided figures, the surfaces thus provided offering a large area to support the total pressures thrown thereon and the forms being such that they are easily formed in the pressed material of the hub parts and when formed have a greater power for resisting deflection than is the case with some of the other figures.

The drawings show two eight-sided polygons $k$ and $l$ formed in the material of both the inner hub part $a$ and the outer hub part $b$. The surfaces are tapered as in a section of a pyramid and the set $l$ is made to easily clear the set $k$, as in the other forms of engaging means. The drawings show the two sets of surfaces of the outer hub part $b$ arranged symmetrically with regard to one another, whereas the two sets of surfaces of the inner hub part $a$ are displaced with regard to one another through a small angular distance. It will, however, be clear that the sets of either hub part may be symmetrical so long as those of the other part are displaced. It will also be clear that one set of surfaces may be parallel to the axis and the other tapered.

Figure 12:
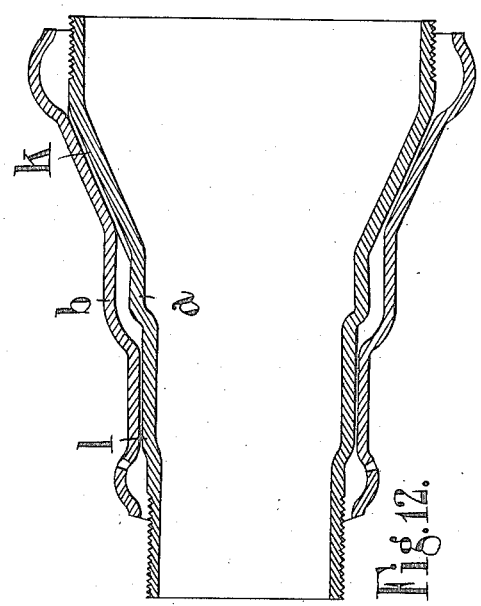
Figures 11 and 12 show a modified form of the connection shown in Figures 9 and 10.
Figure 11:
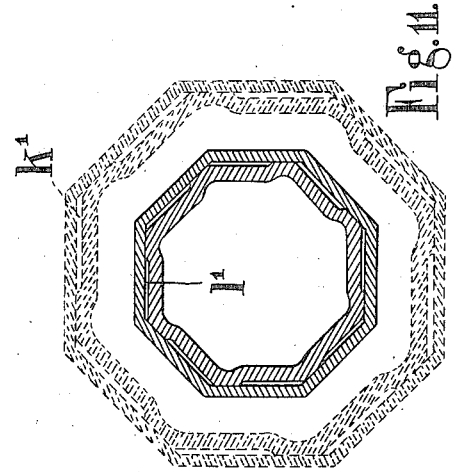

In the form shown in Figures 11 and 12 the surfaces of the two sets of engaging means are symmetrical in both the hub parts, but in order to effect the close contact for driving in one direction in one set and the close contact for driving in the other direction in the other set, a large portion of the surfaces of the set $k$ of the inner hub part are cut away or formed as if they had been cut away upon one side, as shown at $k_1$ and a large portion of the surfaces of the other set $l$ of the inner hub part are similarly treated upon the other side, as shown at $l_1$. This has the same effect with regard to driving as the angular displacement of the surfaces and, as already indicated, it may be carried out in one hub part or the other as may be found most convenient. In the drawings it will be seen that one set of surfaces is tapered and the other set parallel with the axis, but it will be clear that both sets may be tapered.

The structures indicated in Figures 9–12, although presenting advantages in view of the ease with which a strong structure may be formed from sheet material, are open to objections as indicated in Figures 13, 14, 15 and 16.

In Figures 13 and 14 the engaging means are continuous throughout the hub, while in Figures 15 and 16 there are two separate sets of engaging means in different rotational planes. In all forms, however, as produced by ordinary manufacturing processes there is the possibility that engagement will take place upon two opposite parallel sides as indicated at $m$ $m_1$, Figure 13, whereas a clearance as shown at $m_2$ $m_3$, $m_4$ and $m_5$ will exist between the other sides or faces which will allow sliding movement in a radial direction parallel with the sides which are in close contact.

In Figures 15 and 16 the same objection may exist, close contact being established at $n$, $n_1$, $o$, $o_1$, at the inside ends of the hubs and at $p$, $p_1$, $q$, $q_1$, at the outside ends of the hubs, and clearance existing at $n_2$, $n_3$, $n_4$, and $n_5$, $p_2$, $p_3$, $p_4$, and $p_5$, also at $o_2$, $o_3$, $o_4$ and $o_5$, $q_2$, $q_3$, $q_4$, and $q_5$.

Figures 17 and 18 show a hub structure with continuous engaging means for overcoming the foregoing objection, and in this it will be seen that an odd number of sides are provided in the regular polygon which a cross section of the hub structure presents. In this form the axial force applied by a nut screwed upon the thread $e$, results in close contact between at least three pairs of engaging faces as shown at $r$, $r_1$ and $r_2$, Figure 17. As no two of the three pairs of faces are parallel to one another sliding movement in a radial direction parallel to any pair of faces is rendered impossible, and although unavoidable clearance may exist, as shown at $r_3$, $r_4$, $r_5$ and $r_6$ no relative movement of the two hub parts can result therefrom.

In the before described figures which may be considered more or less as diagrams, the possible clearance has been considerably exaggerated for the purpose of showing it clearly and in practice such clearance would be of a very much smaller amount.

Figures 19 and 20 illustrate in somewhat fuller detail the structure of a pair of hub parts $a$ and $b$ positioned upon an axle $s$ with the usual ball bearings in position and a nut $e_2$ screwed upon the thread $e$ and exerting the necessary axial force to retain one hub part upon the other and the desired close contact of the engaging means.

Figures 21 and 22 illustrate a hub having two sets of engaging means acting in different rotational planes in accordance with this invention, each set of engaging means providing in cross section a regular polygon having an odd number of sides. In this structure it will be seen that at the inside end of the hub close contact for driving in one direction is established at $t$, $t_1$, and $t_2$, and at the outside end of the hub a similar contact for driving in the opposite direction is established at $v$, $v_1$ and $v_2$. It will be clear from an inspection of the figures that here again the possible clearances $t_3$, $t_4$ and $t_6$ and $v_3$, $v_4$, $v_5$ and $v_6$ have been exaggerated for the sake of clearness.

The above description only relates to detachable wheels, but it will be seen that the invention is equally applicable to many other types of mechanism, such as the mounting of a boss upon a shaft or a pulley upon a shaft, or almost any member which has to be non-rotatably mounted upon a member and have a driving connection with the same.

It is to be understood that the forms and modifications described are given by way of example only and that other constructions may be employed for the purpose, without in any way departing from the spirit of this invention.

Having now described my invention, what I claim as new and desire to secure by Letters Patent is:—

1. A detachable hub for a vehicle wheel having an outer hub part forced upon an inner hub part by a nut or other retaining means, in which said hub parts are provided with sets of complementary engaging means comprising regular polygonal surfaces having an odd number of faces, which under the force exerted by the nut or other means are adapted to form a close contact in one rotational plane or zone for driving in one direction and a close contact in another plane or zone for driving in the other direction.

2. A detachable hub for a vehicle wheel having an outer hub part forced upon an inner hub part by retaining means, such as a nut, in which said hub parts are provided with two sets of complementary engaging means comprising regular polyhedral surfaces having an odd number of faces, which under the force exerted by the retaining means are adapted to form a close contact in a rotational plane at one position in the axial length for driving in one direction and a close contact in another plane at another position in the axial length for driving in the other direction.

3. A detachable wheel having a central sleeve part forced upon an inner co-operating part by retaining means, such as a nut, in which said co-operating parts are provided with sets of complementary engaging means adapted to effect rotational driving which sets under the force exerted by the retaining means provide a close contact in one plane of rotation for driving in one direction and a close contact in another plane of rotation for driving in the other direction.

4. A rotational driving connection such as a detachable wheel hub having a central outer sleeve part forced upon an inner co-operating part by retaining means, such as a nut, in which said co-operating parts are provided with sets of complementary engaging means ensuring joint rotation, which under the force exerted by the retaining means provide in a plane of rotation near one end of the sleeve a close contact of the engaging means for driving in one direction and in a plane of rotation near the other end a close contact for driving in the other direction.

5. A rotational driving connection such as a detachable wheel hub having a central outer sleeve part forced upon an inner co-operating part by retaining means, such as a nut, in which means ensuring joint rotation of the co-operating parts are forced together in opposite rotational directions at two places in the length of the sleeve so that tortional stress exists in the intervening portion.

6. A rotational driving connection such as a detachable wheel hub, comprising an outer part having a central aperture of decreasing cross sectional area which upon various sections gives the outlines of polygons having an odd number of equal sides exceeding four, and an inner member generally complementary at said various sections to the aperture and held in close contact therewith by retaining means.

7. A rotational driving connection such as a detachable wheel hub comprising an outer member having a central aperture of decreasing cross sectional area, which upon various sections gives the outlines of polygons having an odd number of equal sides exceeding four and an inner member generally complementary at said various sections to the aperture, the sections of one end of one member having a small angular displacement about the axis relative to the sections of its opposite end so that the axial forcing of one member on to the other member ensures close contact for transmitting a drive in either direction.

8. A rotational driving connection such as a detachable wheel hub comprising an outer member having a central aperture of decreasing cross sectional area, which upon various sections gives the outlines of polygons having any number of equal sides exceeding four and an inner member generally complementary at said various sections to the aperture, the sections of one end of one member having a small angular displacement about the axis relative to the sections of its opposite end so that the axial forcing of one member on to the other member ensures close contact for transmitting a drive in either direction.

9. A rotational driving connection such as a detachable wheel hub having a central outer sleeve part positioned upon an inner co-operating part, in which the forcing of one part onto the other effects centering at regions not greatly remote from each end by the close contact of the surfaces of multi-sided figures adapted to transmit a rotational drive.

10. A rotational driving connection such as a detachable wheel hub having an outer sleeve part forced upon an inner part by retaining means, such as a nut, in which said parts are provided with not less than one set of complementary multisided mutually engaging means adapted to transmit a rotational drive at locations not greatly remote from both of the ends of the sleeve.

In testimony whereof I have signed my name to this specification.

JOHN V. PUGH.